(12) United States Patent
Leijten et al.

(10) Patent No.: US 7,574,583 B2
(45) Date of Patent: Aug. 11, 2009

(54) PROCESSING APPARATUS INCLUDING DEDICATED ISSUE SLOT FOR LOADING IMMEDIATE VALUE, AND PROCESSING METHOD THEREFOR

(75) Inventors: Jeroen Anton Johan Leijten, Eindhoven (NL); Willem Charles Mallon, Eindhoven (NL)

(73) Assignee: Silicon Hive B.V., Eindhoven (NL)

( * ) Notice: Subject to any disclaimer, the term of this patent is extended or adjusted under 35 U.S.C. 154(b) by 0 days.

(21) Appl. No.: 10/528,607

(22) PCT Filed: Aug. 8, 2003

(86) PCT No.: PCT/IB03/03561

§ 371 (c)(1),
(2), (4) Date: Mar. 21, 2005

(87) PCT Pub. No.: WO2004/029796

PCT Pub. Date: Apr. 8, 2004

(65) Prior Publication Data

US 2006/0168424 A1 Jul. 27, 2006

(30) Foreign Application Priority Data

Sep. 24, 2002 (EP) .................................. 02078956

(51) Int. Cl.
*G06F 15/80* (2006.01)
(52) U.S. Cl. ........................................................ 712/24
(58) Field of Classification Search .................... 712/24
See application file for complete search history.

(56) References Cited

U.S. PATENT DOCUMENTS 5,787,302 A * 7/1998 Hampapuram et al. ........ 712/24

(Continued)

FOREIGN PATENT DOCUMENTS

EP 0 886 210 12/1998

(Continued)

OTHER PUBLICATIONS

Yahoo! Dictionary definition for "dedicated", source education.yahoo.com, 2006.*

(Continued)

*Primary Examiner*—Richard Ellis
(74) *Attorney, Agent, or Firm*—Leydig, Voit & Mayer Ltd.

(57) ABSTRACT

Differences in encoding efficiency of instructions may arise if certain operations require very large immediate values as operands, as opposed to others requiring no immediate values or small immediate values. The present invention describes a processing apparatus, a compiler as well as a method for processing data, allowing the use of instructions that require large immediate data, while simultaneously maintaining an efficient encoding and decoding of instructions. The processing apparatus comprises a plurality of issue slots (UC0, UC1, UC2, UC3), wherein each issue slot comprises a plurality of functional units (FU20, FU21, FU22). The processing apparatus is arranged for processing data, based on control signals generated from a set of instructions being executed in parallel. The processing apparatus further comprises a dedicated issue slot (UC4) arranged for loading an immediate value (IMV1) in dependence upon a dedicated instruction (IMM). The immediate value (IMV1) can be stored in a dedicated register file (RF2) and the issue slot requiring this value can retrieve it from the dedicated register file (RF2).

13 Claims, 4 Drawing Sheets

U.S. PATENT DOCUMENTS 5,974,537 A * 10/1999 Mehra ................ 712/215
6,122,722 A * 9/2000 Slavenburg ............ 712/24

FOREIGN PATENT DOCUMENTS

| EP | 0 899 656 | 3/1999 |
|---|---|---|
| JP | 07-182169 | 7/1995 |
| JP | 11-007387 | 1/1999 |
| WO | WO 98/27486 | 6/1998 |

OTHER PUBLICATIONS

Rosenberg, Jerry M. Dictionary of Computers, Information Processing & Telecommunications, Second Edition, John Wiley & Sons, 1984, pp. 282.*

Webster's Ninth New Collegiate Dictionary, Merriam-Webster Inc., 1990, pp. 332.*

* cited by examiner

PROCESSING APPARATUS INCLUDING DEDICATED ISSUE SLOT FOR LOADING IMMEDIATE VALUE, AND PROCESSING METHOD THEREFOR

TECHNICAL FIELD

The invention relates to a processing apparatus conceived for processing data, based on control signals generated from a set of instructions being executed in parallel, comprising: a plurality of issue slots, wherein each issue slot comprises a plurality of functional units, the plurality of issue slots being controlled by a set of control words, corresponding to the set of instructions.

The invention further relates to a method for processing data, said method comprising the following steps:
storing input data in a register file;
processing data retrieved from the register file based on control signals generated from a set of instructions being executed in parallel, using a plurality of issue slots controlled by a set of control words being generated from the set of instructions;
and wherein each issue slot comprises a plurality of functional units.

The invention further relates to an instruction set, comprising a plurality of instructions for execution by said processing apparatus.

The invention further relates to a computer program comprising computer program code means for instructing a computer system to perform the steps of said method.

The invention further relates to a compiler program product for generating a sequence of sets of instructions being arranged for execution by said processing apparatus.

The invention still further relates to an information carrier comprising a sequence of sets of instructions being arranged for execution by said processing apparatus.

BACKGROUND ART

Computer architectures consist of a fixed data path, which is controlled by a set of control words. Each control word controls parts of the data path and these parts may comprise register addresses and operation codes for arithmetic logic units (ALUs) or other functional units. Each set of instructions generates a new set of control words, usually by means of an instruction decoder which translates the binary format of the instruction into the corresponding control word, or by means of a micro store, i.e. a memory which contains the control words directly. Typically, a control word represents a RISC like operation, comprising an operation code, two operand register indices and a result register index. The operand register indices and the result register index refer to registers in a register file.

In case of a Very Large Instruction Word (VLIW) processor, multiple instructions are packaged into one long instruction, a so-called VLIW instruction. A VLIW processor uses multiple, independent functional units to execute these multiple instructions in parallel. The processor allows exploiting instruction-level parallelism in programs and thus executing more than one instruction at a time. In order for a software program to run on a VLIW processor, it must be translated into a set of VLIW instructions. The compiler attempts to minimize the time needed to execute the program by optimizing parallelism. The compiler combines instructions into a VLIW instruction under the constraint that the instructions assigned to a single VLIW instruction can be executed in parallel and under data dependency constraints. Encoding of instructions can be done in-two different ways, for a data stationary VLIW processor or for a time stationary VLIW processor, respectively. In case of a data stationary VLIW processor all information related to a given pipeline of operations to be performed on a given data item is encoded in a single VLIW instruction. For time stationary VLIW processors, the information related to a pipeline of operations to be performed on a given data item is spread over multiple instructions in different VLIW instructions, thereby exposing said pipeline of the processor in the program.

In practical applications, the functional units will be active all together only rarely. Therefore, in some VLIW processors, fewer instructions are provided in each VLIW instruction than would be needed for all the functional units together. Each instruction is directed to a selected functional unit that has to be active, for example by using multiplexers. In this way it is possible to save on instruction memory size while hardly compromising performance. In this architecture, instructions are directed to different functional units in different clock cycles. The corresponding control words are issued to a respective issue slot of the VLIW issue register. Each issue slot is associated with a group of functional units. A particular control word is directed to a specific one among the functional units of the group that is associated with the particular issue slot.

The encoding of parallel instructions in a VLIW instruction leads to a severe increase of the code size. Large code size leads to an increase in program memory cost both in terms of required memory size and in terms of required memory bandwidth. In modem VLIW processors different measures are taken to reduce the code size. One important example is the compact representation of no operation (NOP) operations in a data stationary VLIW processor, i.e. the NOP operations are encoded by single bits in a special header attached to the front of the VLIW instruction, resulting in a compressed VLIW instruction.

Instruction bits may still be wasted in each instruction of a VLIW instruction, because some instructions can be encoded in a more compact way than others can. Differences in encoding efficiency of instructions arise, for instance, because certain operations require very large immediate values as operands, as opposed to others requiring no immediate values or small immediate values. Instructions requiring very large immediate values are commonly used for initialization of register values. Especially in processors with a large datapath width, typically larger than 16 bits, it can be very expensive to initialize registers using a single instruction. Encoding the immediate value alone already requires as many bits as the datapath width, and additional bits for encoding of the operation code and register index are required as well. In case different instructions also have to be encoded for the same issue slot and these instructions require fewer bits, a very inefficient instruction encoding is obtained for this particular issue slot. This is, for instance, the case in VLIW architectures with a fixed control word width, since in combination with a varying instruction width the decoding process becomes less efficient. U.S. Pat. No. 5,745,722 describes an apparatus for executing a program which contains immediate data and a program conversion method for generating an instruction which the apparatus can carry out. The program conversion method is used for encoding immediate data at the time of converting a program into a desired program format, thereby reducing the size of an instruction code. The program conversion method is mainly used by a compiler. When executing the resulting program, instructions, including instructions having immediate data, are sequentially fetched and decoded so that an execution section carries out the fetched instruction. When the instruction decoder detects that the instruction code contains immediate data, the immediate data is transmitted to a data decoder. When the immediate data is encoded, the data decoder decodes the data according to a given rule, thereby generating decoded immediate data The decoded immediate data is then transmitted to an execution unit to be processed. When the supplied immediate data is not encoded the data decoder sends the data intact to the execution unit.

It is a disadvantage of the prior art processing apparatus that during decoding of instructions an additional step is required for decoding of encoded immediate data

DISCLOSURE OF INVENTION

An object of the invention is to provide a processing apparatus that allows the use of large immediate values as operands, while maintaining an efficient encoding and decoding of instructions.

This object is achieved with a processing apparatus of the kind set forth, characterized in that the processing apparatus further comprises a dedicated issue slot arranged for loading an immediate value in dependence upon a dedicated instruction comprising the immediate value. In the processing apparatus according to the invention, large immediate values do not have to be encoded in the instructions issued to the plurality of issue slots, but they can be encoded in the dedicated instruction issued to the dedicated issue slot. As a result, the width of the corresponding instructions decreases, which may allow a more efficient encoding of instructions for that particular issue slot. Since large immediate values are commonly used only for initializing register values, a significant increase in efficiency can be obtained.

An embodiment of the processing apparatus according to the invention, wherein the dedicated issue slot comprises a single functional unit arranged for only executing the dedicated instruction. As a result, only one type of instruction needs to be encoded for the dedicated issue slot, meaning that no bits for encoding the operation code are required, reducing the width of the dedicated instruction.

An embodiment of the processing apparatus according to the invention is characterized in that the processing apparatus further comprises a dedicated register file for storing said immediate value, the dedicated register file being accessible by the dedicated issue slot. Therefore, the number of bits in the dedicated instruction required for encoding the destination of result data can be reduced.

An embodiment of the processing apparatus according to the invention, wherein said processing apparatus is a VLIW processor and wherein said set of instructions is grouped in a VLIW instruction. A VLIW processor allows executing multiple instructions in parallel, increasing the overall speed of operation, while having relatively simple hardware.

According to the invention a method for processing data is characterized in that the method further comprises a step of loading an immediate value into a dedicated issue slot in dependence upon a dedicated instruction comprising the immediate value. The method allows the use of instructions requiring large immediate values, while maintaining an efficient encoding and decoding process.

According to the invention an instruction set is characterized in that the instruction set further comprises a dedicated instruction having an immediate value, which dedicated instruction when executed by a dedicated issue slot causes the dedicated issue slot to load the immediate value. The instruction set according to the invention allows the use of operations using large immediate values, while not compromising on the efficiency of encoding and decoding of instructions.

According to the invention a compiler program product is characterized in that the sequence of sets of instructions further comprises a dedicated instruction having an immediate value, which dedicated instruction when executed by a dedicated issue slot causes the dedicated issue slot to load the immediate value. The compiler according to the invention generates efficiently encoded instructions, allowing the use of large immediate values, while maintaining an efficient decoding process for the instructions.

Preferred embodiments of the invention are defined in the dependent claims. A computer program for implementing the method according to the invention for processing data is defined in claim 10. An information carrier comprising a sequence of sets of instructions being arranged for execution by a processing apparatus according to the invention for processing data is defined in claim 12.

DESCRIPTION OF PREFERRED EMBODIMENTS

Figure 1:
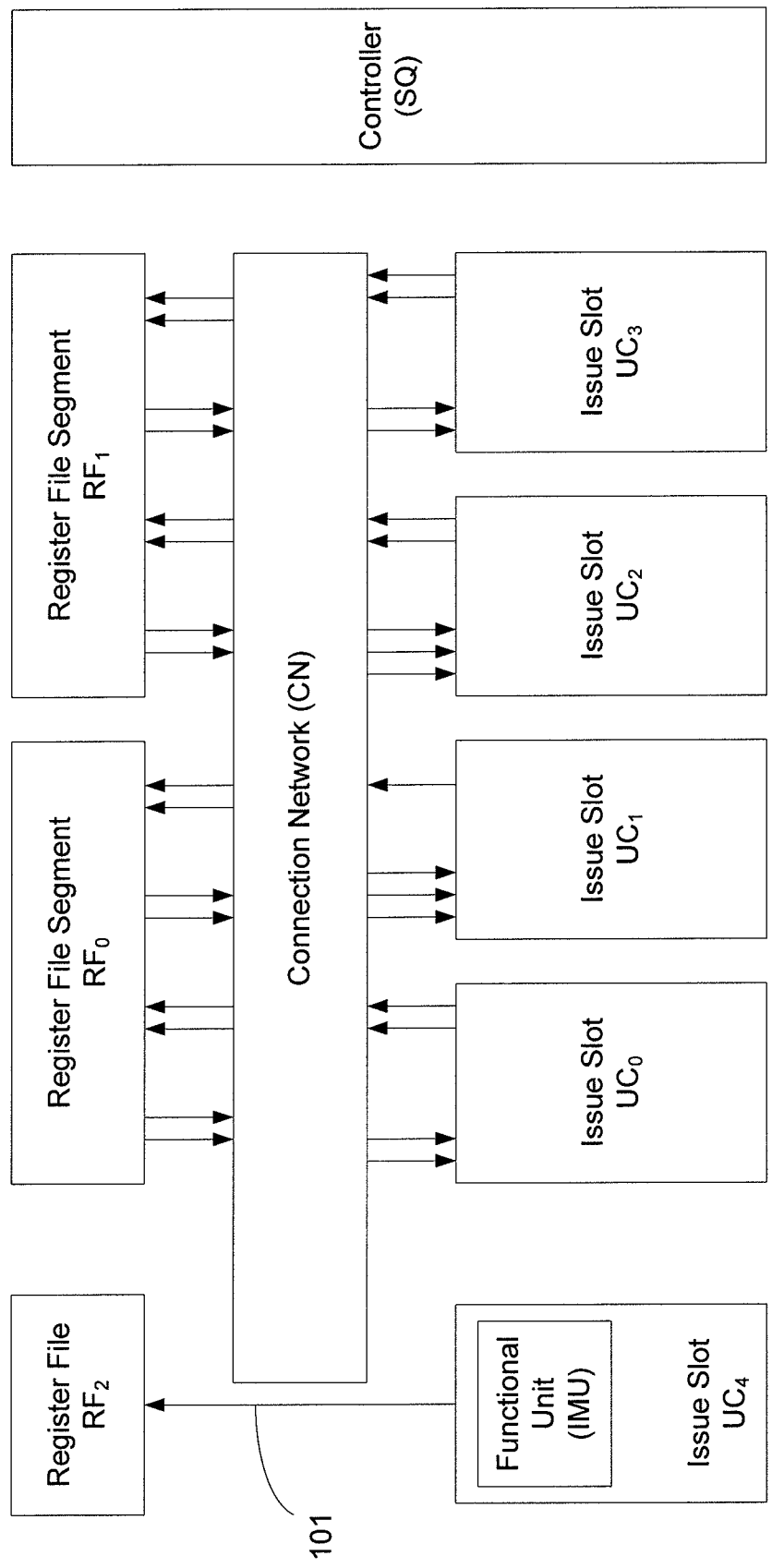
FIG. 1 is a schematic block diagram of a VLIW processor according to the invention.

Referring to FIG. 1, a schematic block diagram illustrates a VLIW processor comprising a plurality of issue slots, including issue slot $UC_0$, $UC_1$, $UC_2$ and $UC_3$, and a register file, including register file segments $RF_0$ and $RF_1$. The processor has a controller SQ and a connection network CN for coupling the register file segments $RF_0$ and $RF_1$, and the issue slots $UC_0$, $UC_1$, $UC_2$ and $UC_3$. The register file segments $RF_0$ and $RF_1$ are coupled to a bus, not shown in FIG. 1, and via this bus the register file segments receive input data. Instructions issued to issue slots $UC_0$, $UC_1$, $UC_2$ and $UC_3$ comprise RISC like operations, requiring only two operands and producing only one result, as well as custom operations that can consume more than two operands and/or that can produce more than one result. Some instructions may require small or large immediate values as operand data. Connection network CN allows passing of input data and result data between the register file segments $RF_0$ and $RF_1$, and the issue slots $UC_0$, $UC_1$, $UC_2$ and $UC_3$.

The VLIW processor further comprises a dedicated issue slot $UC_4$ and a dedicated register file $RF_2$. The dedicated issue slot $UC_4$ is coupled 101 to the dedicated register file $RF_2$. The dedicated register file $RF_2$ is coupled to the plurality of issue slots $UC_0$-$UC_3$ via the connection network CN. A dedicated instruction is issued to issue slot $UC_4$, and this instruction comprises an immediate value, which is needed during execution of an instruction in one of the plurality of issue slots $UC_0$-$UC_3$. The dedicated issue slot $UC_4$ comprises a single functional unit IMU, which is capable of executing the dedicated instruction. When executing this instruction, the corresponding immediate value is passed to the dedicated register file $RF_2$ by the dedicated issue slot $UC_4$. This immediate value can be read from the dedicated register file $RF_2$ by the plurality of issue slot $UC_0$-$UC_3$, via the connection network CN, and subsequently used for further processing.

In an advantageous embodiment, the dedicated register file $RF_4$ comprises a single register. As a result, no bits in the dedicated instruction are required for encoding of the register address. Furthermore, only the issue slot $UC_4$ is allowed to write data to the dedicated register file $RF_2$, so that no bits are required in the dedicated instruction for encoding the selection of the register file to which data have to be written. Finally, the issue slot $UC_4$ comprises only a single functional unit IMU and only one type of instruction, i.e. the dedicated instruction, is issued to issue slot $UC_4$. As a result only one instruction needs to be encoded for issue slot $UC_4$, meaning that no bits are required in the dedicated instruction for encoding the operation code. Since loading an immediate value does not require any operands, operand register indices do not have to be encoded in the dedicated instruction either. As a final result, the dedicated instruction for loading of an immediate value can be encoded with a number of bits equal to the width of the immediate value itself.

In some embodiments, the register file segments $RF_0$ and $RF_1$ are distributed register files, i.e. several register files, each for a limited set of issue slots, are used instead of one central register file for all issue slots $UC_0$-$UC_3$. An advantage of a distributed register file is that it requires less read and write ports per register file segment, resulting in a smaller register file bandwidth. Furthermore, it improves the scalability of the processor when compared to a central register file.

In some embodiments, the connection network CN is a partially connected network, i.e. not each issue slot $UC_0$-$UC_3$ is coupled to each register file segment $RF_0$ and $RF_1$. The use of a partially connected communication network reduces the code size as well as the power consumption, and also allows increasing the performance of the processor. Furthermore, it improves the scalability of the processor when compared to a fully connected connection network.

Figure 2:
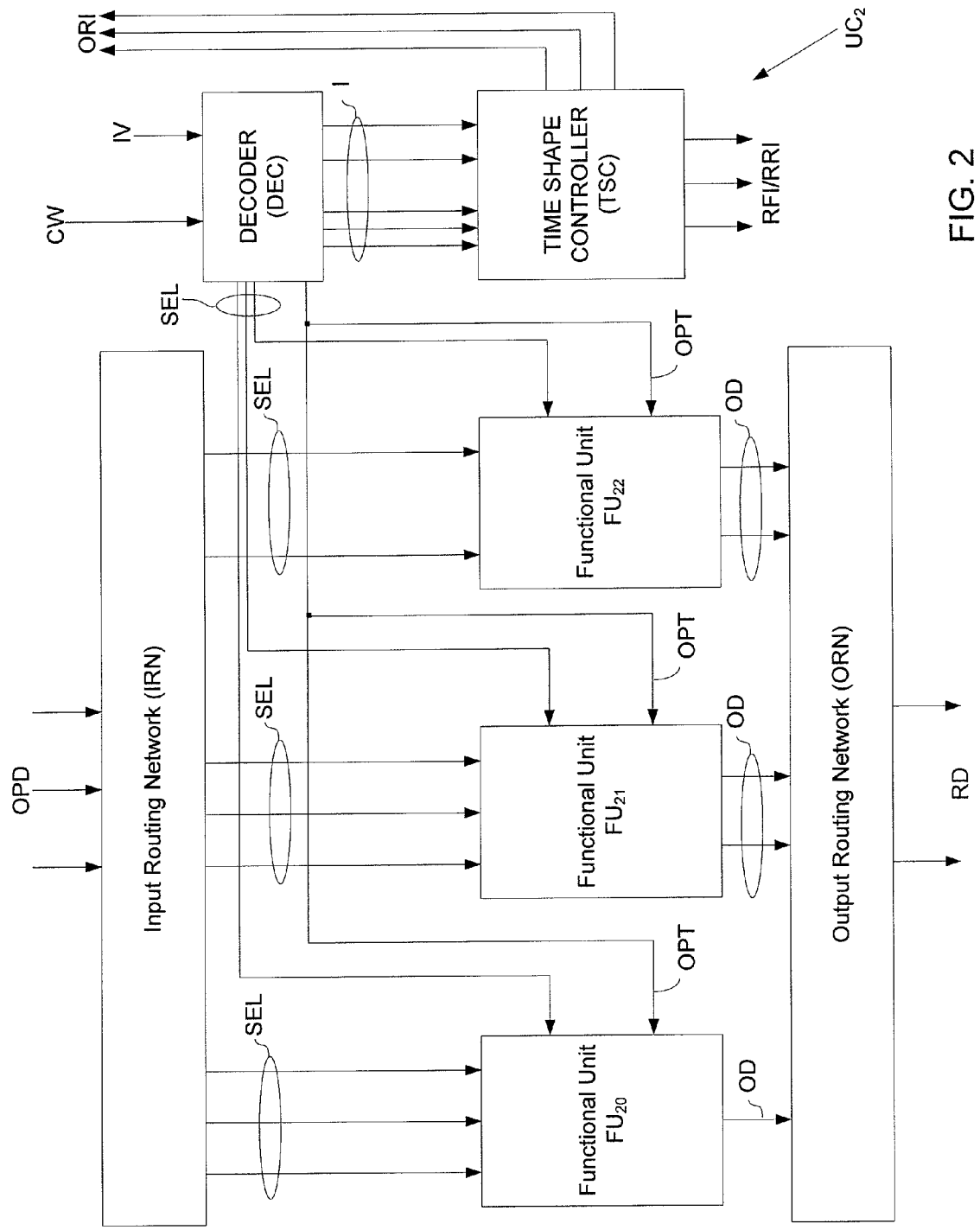
FIG. 2 is a schematic block diagram of issue slot $UC_2$, comprising three functional units.

Referring to FIG. 2, a schematic block diagram shows an embodiment of issue slot $UC_2$. Issue slot $UC_2$ comprises a decoder DEC, a time shape controller TSC, and input routing network IRN, an output routing network ORN, and a plurality of functional units $FU_{20}$, $FU_{21}$ and $FU_{22}$. The decoder DEC decodes the control word CW applied to the issue slot in each clock cycle. Results of the decoding step are operand register indices ORI, which refer to the registers in the register file segments $RF_0$ and $RF_1$ where the operand data for the operation to be executed are stored. Further results of the decoding step are result file indices RFI and result register indices RRI, which refer to the registers in the register file segments $RF_0$ and $RF_1$ where the result data have to be stored. The decoder DEC passes the indices ORI, RFI and RRI to the time shape controller TSC, via couplings I. The time shape controller TSC delays the indices ORI, RFI and RRI by the proper amount, according to the input/output behavior of the functional unit on which the operation is executed, and passes the indices to the connection network CN, shown in FIG. 1. If the VLIW instruction comprises instructions for issue slot $UC_2$, the decoder DEC selects one of the functional units $FU_{20}$, $FU_{21}$ or $FU_{22}$, via a coupling SEL, to perform an operation. Furthermore, the decoder DEC passes information on the type of operation that has to be performed to that functional unit, using a coupling OPT. The input routing network IRN passes the operand data OPD to the functional units $FU_{20}$, $FU_{21}$ and $FU_{22}$, via couplings ID. The functional units $FU_{20}$, $FU_{21}$ and $FU_{22}$ pass their result data to the output routing network ORN via coupling OD, and subsequently the output routing network ORN passes the result data RD to the connection network CN, shown in FIG. 1. Via connection network CN the result data RD can be stored in register file segments $RF_0$ and $RF_1$. An instruction valid bit IV is passed to the decoder DEC and in case of a NOP operation, this bit is equal to zero. The decoder DEC uses this information during selection of a functional unit and if the instruction valid bit IV is equal to zero, no result data RD are written to the output routing network ORN by that functional unit, to avoid contamination of data stored in the register file segments $RF_0$ and $RF_1$. The instruction valid bit will be further discussed in FIG. 4. For performing custom operations, functional units $FU_{20}$ and $FU_{21}$ can handle three operand data, and functional units $FU_{21}$ and $FU_{22}$ can produce two output data Furthermore, the functional units may use a large immediate value as an operand.

Embodiments of issue slots $UC_0$, $UC_1$ and $UC_3$ are not shown. These issue slots also comprise a set of functional units, capable of executing RISC like instructions or more complex instructions, requiring more than two operands and/or producing more than one result data. These functional units may also require either small or large immediate values as operand data.

Figure 3:
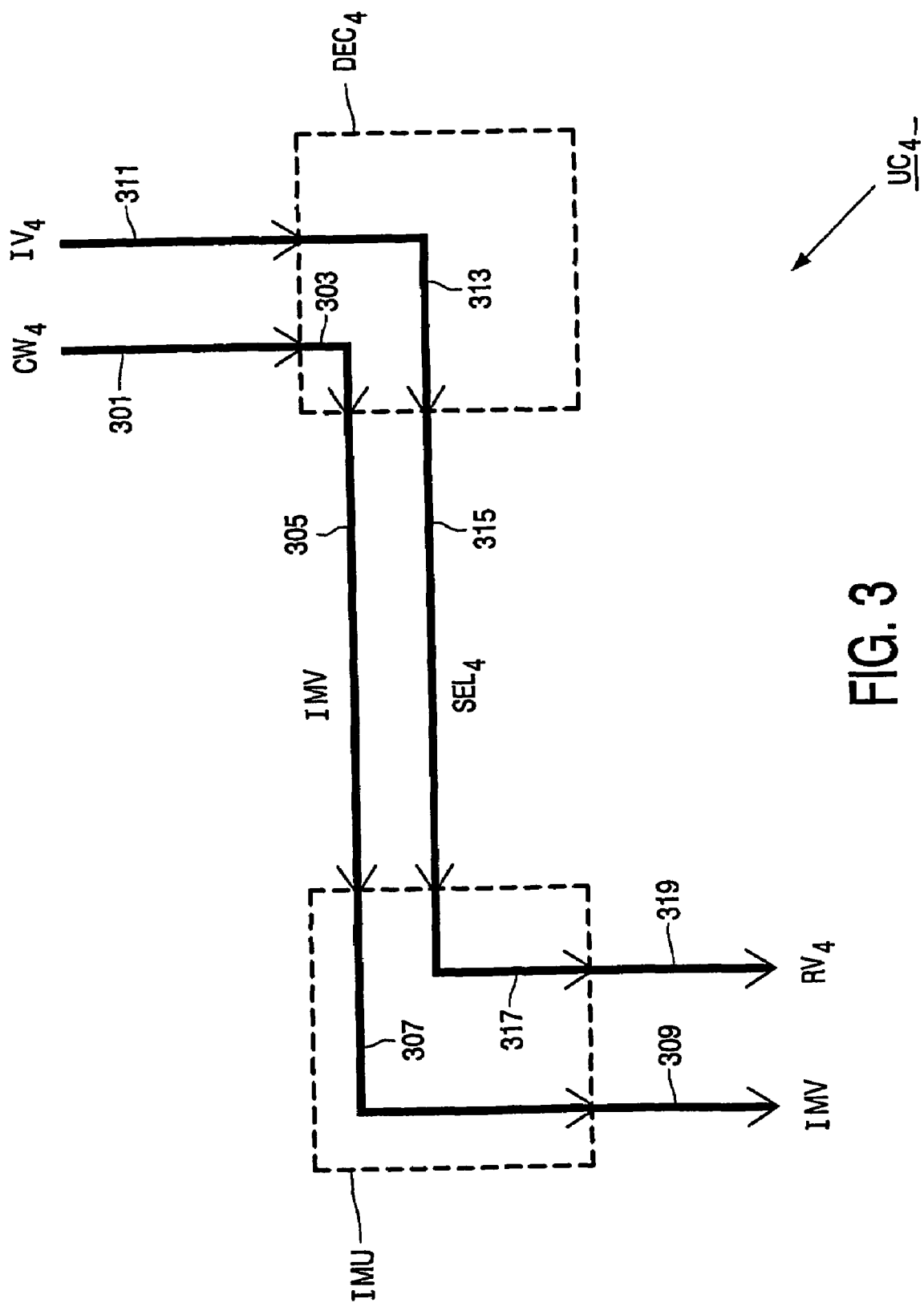
FIG. 3 is a schematic block diagram of dedicated issue slot $UC_4$, comprising a single functional unit.

Referring to FIG. 3, an advantageous embodiment of dedicated issue slot $UC_4$ is shown. Dedicated issue slot $UC_4$ comprises a single functional unit IMU, which is only capable of executing the dedicated instruction, and a decoder $DEC_4$. The dedicated instruction issued to dedicated issue slot $UC_4$, only comprises a large immediate value, and no bits for encoding of operand data registers, register file index and result register indices, and operand code are required. The corresponding control word $CW_4$ only comprises a large immediate value as well. The control word $CW_4$ is applied to the decoder $DEC_4$, via coupling 301, and the corresponding large immediate value IMV is directly routed to an output of decoder $DEC_4$, via coupling 303. The large immediate value IMV is further passed to the immediate data input of functional unit IMU, via coupling 305. Inside the functional unit IMU, the large immediate value IMV is directly routed to the result data output of the functional unit, via coupling 307. Finally, the large immediate value IMV is passed to the dedicated register file $RF_4$, via coupling 309. An instruction valid bit $IV_4$ is received by decoder $DEC_4$ and passed to the functional unit select input via coupling 311, 313 and 315. The result valid output of functional unit IMU is directly connected to the functional unit select input, via coupling 317. In case of a NOP operation, the instruction valid bit $IV_4$ is equal to zero. The result valid output bit $RV_4$ will then be equal to zero too and as a result the large immediate value IMV is not passed to the dedicated register file $RF_2$. The instruction valid bit $IV_4$ will be further discussed in FIG. 4. In fact, the decoder $DEC_4$ and the functional unit IMU are empty. The large immediate value IMV, corresponding to control word $CW_4$, is directly routed to the result data output of functional unit IMU, via couplings 301, 303, 305 and 307. The instruction valid bit $IV_4$ is directly routed to the result valid output of functional unit IMU, via couplings 311, 313, 315 and 317. Issue slot $UC_4$ does not require an input or output routing network. It does not require a time shape controller either, since no result file index and result register index are required.

Figure 4:
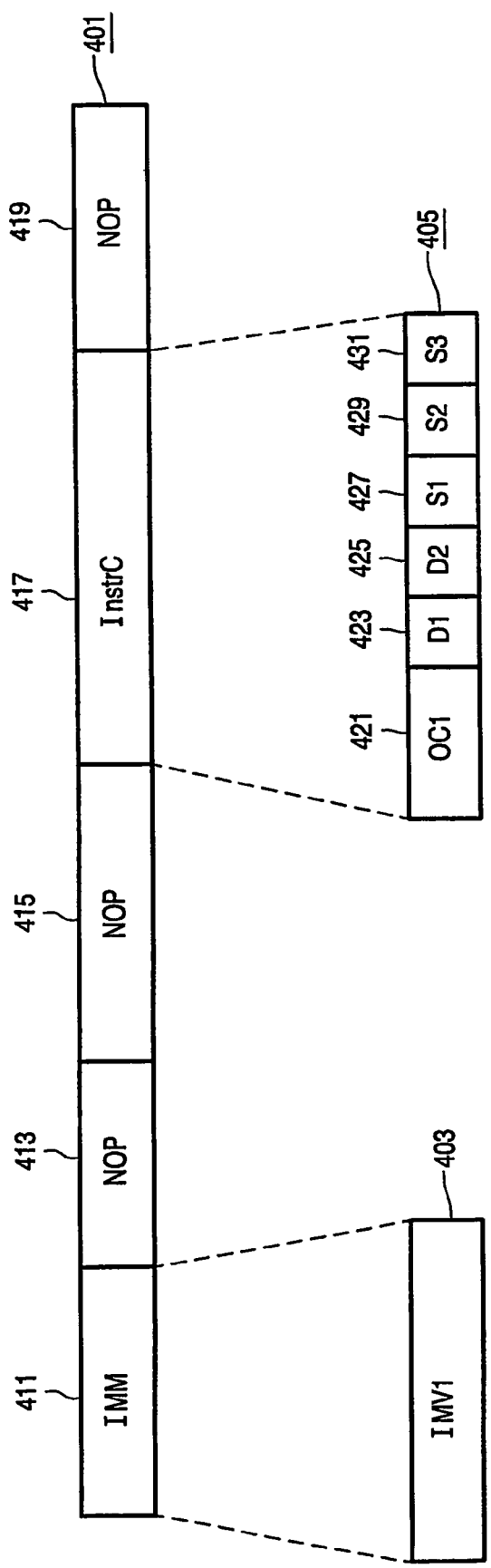
FIG. 4 shows a VLIW instruction and a corresponding compressed VLIW instruction.

Referring to FIG. 4, examples of VLIW instructions are shown for the VLIW processor shown in FIG. 1. The VLIW instruction 401 comprises five control words 411-419. Onto control words 413-419 an instruction is mapped for a corresponding issue slot $UC_0$, $UC_1$, $UC_2$ and $UC_3$, respectively. Onto control word 411 a dedicated instruction is mapped for dedicated issue slot $UC_4$. The control words 413, 415 and 419 comprise a NOP operation, associated with issue slots $UC_0$, $UC_1$ and $UC_3$ respectively. Control word 411 comprises dedicated instruction IMM and control word 417 comprises instruction InstrC, corresponding to dedicated issue slot $UC_4$ and issue slot $UC_2$, respectively. For an advantageous embodiment, the instruction format for instruction IMM is shown by instruction 403, which only comprises a large immediate value IMV1. A possible instruction format for instruction InstrC is shown by instruction 405, having six fields 421-431, associated with an operation code OC1, two result register indices D1 and D2 and three operand register indices S1, S2 and S3, respectively. Different instruction formats maybe used for different instructions mapped onto the same control word 411-419. The instruction format may be varied, e.g. depending on the type of instruction that has to be executed, or on the use of an immediate value as an operand opposed to retrieving one from the register files. For example, in instruction 405 more bits could be spent on encoding more operations or small immediate values, and less on operand register indices. Control word 411 may comprise a NOP operation, in case no immediate value has to be loaded by dedicated issue slot $UC_4$.

The uncompressed VLIW instruction 401 can be compressed by encoding the NOP operations using a set of dedicated bits. An example of a compressed instruction, after compressing VLIW instruction 401 is shown by VLIW instruction 407, which comprises a field 433 having a set of dedicated bits, and control words 435 and 437 having instructions IMM and InstrC, respectively. Single bits in the set of dedicated bits encode the NOP operations mapped onto the control words 413, 415 and 419 of VLIW instruction 401. A bit '0' refers to a NOP operation and the position of the bit in the field 433 denotes to the control word within VLIW instruction 401 that holds this NOP operation. The '0' bits at positions two, three and five within field 433 refer to the NOP operations present in VLIW instruction 401 in control words 413, 415 and 419, respectively. A bit '1' present in field 433 refers to an instruction having a non-NOP operation, and the position of the bit in the field 433 points to the control word within VLIW instruction 401 onto which the instruction is mapped. The '1' bit at positions one and four within field 433 refer to the instructions DAM and InstrC in control words 411 and 417, respectively. In other embodiments, different ways of compressing VLIW instructions may be applied, as known by the person skilled in the art.

The VLIW processor shown in FIG. 1 is capable of executing instructions requiring large immediate values. During compilation of the software program to run on the VLIW processor, the compiler recognizes constants present in the software program. In case these constants can not be encoded as an immediate value in a single instruction, the compiler may create a dedicated instruction for loading of this immediate value. In the instruction requiring the immediate value, the address of dedicated register file $RF_2$ is encoded, for retrieving the immediate value. For example, for loading of large immediate value IMV1 required by instruction InstrC, the dedicated instruction IMM is encoded. The large immediate value IMV1 is then replaced by the address of register file $RF_2$ in instruction 405, as operand register index S3. In this way an efficient encoding of VLIW instructions is obtained, since the instruction width is allowed to decrease. In an advantageous embodiment, the VLIW instruction is a compressed VLIW instruction 407, in order to further reduce the code size. The dedicated bits in field 433 can be simultaneously used as instruction valid bits IV and $IV_4$, for their corresponding issue slot. The compressed VLIW instruction 407 is decompressed by decompression logic present in controller SQ, by adding control words comprising NOP operations to the VLIW instruction 407, using the '0' bits and their position in field 433. When executing the VLIW instruction 401, the large immediate value IMV1 is loaded by dedicated issue slot $UC_4$ and stored in dedicated register file $RF_2$. The issue slot $UC_2$, when executing instruction InstrC, retrieves this value from the dedicated register file $RF_2$, via the connection network CN, using operand register index S3. An efficient decoding process is obtained, as the instructions are decoded by decoder DEC, without requiring any additional decoding steps. The hardware of dedicated issue slot $UC_4$ can be very simple, by means of wiring without requiring any control logic. In case loading of a large immediate value is not required in a particular VLIW instruction, a NOP operation is mapped onto control word 411.

A superscalar processor also comprises multiple issue slots that can perform multiple operations in parallel, as in case of a VLIW processor. However, the processor hardware itself determines at runtime which operation dependencies exist and decides which operations to execute in parallel based on these dependencies, while ensuring that no resource conflicts will occur. The principles of the embodiments for a VLIW processor, described in this section, also apply for a superscalar processor. In general, a VLIW processor may have more issue slots in comparison to a superscalar processor. The hardware of a VLIW processor is less complicated in comparison to a superscalar processor, which results in a better scalable architecture. The number of issue slots and the complexity of each issue slot, among other things, will determine the amount of benefit that can be reached using the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A processing apparatus for processing data, based on control signals generated from a set of instructions being executed in parallel, comprising:
    a plurality of issue slots, wherein each issue slot comprises a plurality of functional units, the plurality of issue slots being controlled by a set of control words, corresponding to the set of instructions,
    wherein the processing apparatus further comprises a dedicated issue slot arranged for loading an immediate value in dependence upon a dedicated instruction comprising the immediate value, the processing apparatus further comprising a dedicated register file dedicated solely for said immediate value, the dedicated register file being accessible by the dedicated issue slot.

2. An apparatus according to claim 1, wherein the dedicated issue slot comprises a single functional unit arranged for only executing the dedicated instruction.

3. An apparatus according to claim 1, wherein said processing apparatus is a VLIW processor and wherein said set of instructions is grouped in a VLIW instruction.

4. An apparatus according to claim 3, wherein the VLIW instruction is a compressed VLIW instruction, comprising dedicated bits for encoding NOP operations.

5. An apparatus according to claim 1, further comprising a register file associated with the plurality of issue slots.

6. An apparatus according to claim 5, further comprising a connection network for coupling the plurality of issue slots and the register file.

7. The apparatus of claim 1, wherein the dedicated issue slot is controlled to load the immediate value by a control word consisting of the immediate value.

8. The apparatus of claim 1, wherein the dedicated issue slot comprises a single functional unit arranged for only executing the dedicated instruction, and wherein the dedicated register file can be written to only by the single functional unit of the dedicated issue slot.

9. The apparatus of claim 8, wherein the single functional unit of the dedicated issue slot can only write to the dedicated register file.

10. The processing apparatus of claim 1, further comprising another register file separate from the dedicated register file, for storing input data and result data for the plurality of issue slots except for the dedicated issue slot.

11. A method for processing data, said method comprising:
storing input data in a register file;
processing data retrieved from the register file based on control signals generated from a set of instructions being executed in parallel, using a plurality of issue slots controlled by a set of control words being generated from the set of instructions; and wherein each issue slot comprises a plurality of functional units;
loading an immediate value into a dedicated issue slot in dependence upon a dedicated instruction comprising the immediate value; and
passing the immediate value, received by the dedicated issue slot during the loading step, from the dedicated issue slot to a dedicated register file dedicated solely for said immediate value.

12. The method of claim 11, wherein the dedicated issue slot is controlled to load the immediate value by a control word consisting of the immediate value.

13. The method of claim 11, further comprising executing the dedicated instruction with a single functional unit of the dedicated issue slot.

* * * * *

UNITED STATES PATENT AND TRADEMARK OFFICE
CERTIFICATE OF CORRECTION

PATENT NO. : 7,574,583 B2
APPLICATION NO. : 10/528607
DATED : August 11, 2009
INVENTOR(S) : Leijten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 93 days.

Signed and Sealed this

Seventh Day of September, 2010

David J. Kappos
*Director of the United States Patent and Trademark Office*